United States Patent
Funahashi et al.

(10) Patent No.: US 10,744,972 B2
(45) Date of Patent: Aug. 18, 2020

(54) PEDESTRIAN PROTECTING DEVICE

(71) Applicant: MAZDA MOTOR CORPORATION, Aki-gun, Hiroshima (JP)

(72) Inventors: Ryouji Funahashi, Aki-gun (JP); Tsutomu Watanabe, Hiroshima (JP); Susumu Kuroda, Higashihiroshima (JP); Motoharu Sato, Aki-gun (JP); Yuji Nakanishi, Aki-gun (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 196 days.

(21) Appl. No.: 16/082,525

(22) PCT Filed: Mar. 15, 2017

(86) PCT No.: PCT/JP2017/010473
§ 371 (c)(1),
(2) Date: Sep. 5, 2018

(87) PCT Pub. No.: WO2017/169799
PCT Pub. Date: Oct. 5, 2017

(65) Prior Publication Data
US 2019/0077361 A1    Mar. 14, 2019

(30) Foreign Application Priority Data
Mar. 29, 2016  (JP) .................................. 2016-066510

(51) Int. Cl.
*B60R 21/26* (2011.01)
*B60R 21/38* (2011.01)
(Continued)

(52) U.S. Cl.
CPC .............. *B60R 21/36* (2013.01); *B60R 21/38* (2013.01); *B60R 2021/01231* (2013.01)

(58) Field of Classification Search
CPC ......... B60R 21/36; B60R 21/38; B60R 21/34; B60R 2021/23107; B60R 2021/01211; B60R 2021/01231
(Continued)

(56) References Cited

U.S. PATENT DOCUMENTS 10,471,927 B1 * 11/2019 Gupta ................. B60R 21/0134
2010/0230944 A1    9/2010 Narita et al.

FOREIGN PATENT DOCUMENTS

JP         09030368 A    2/1997
JP        200644289 A    2/2006
(Continued)

OTHER PUBLICATIONS

European Patent Office, Extended European Search Report Issued in Application No. 17774343.2, dated Nov. 21, 2018, Germany, 5 pages.

*Primary Examiner* — Keith J Frisby
(74) *Attorney, Agent, or Firm* — Alleman Hall Creasman & Tuttle LLP

(57) ABSTRACT

A pedestrian protecting device that includes a right air bag device, a left air bag device, G sensors, and an ECU. The air bags include respective tip end portions which vertically overlap each other at a middle portion of a vehicle when the air bags are deployed. The ECU executes a time difference deployment control operation of: when a pedestrian collision position is located at a left side of the middle portion of the vehicle, operating the air bag devices such that a deployment of the right air bag is completed before a deployment of the left air bag is completed; and when the collision position is located at a right side of the middle portion of the vehicle, operating the air bag devices such that the deployment of the left air bag is completed before the deployment of the right air bag is completed.

9 Claims, 10 Drawing Sheets

(51) Int. Cl.
*B60R 21/36* (2011.01)
*B60R 21/01* (2006.01)

(58) Field of Classification Search
USPC ........................................................ 180/274
See application file for complete search history.

(56) References Cited

FOREIGN PATENT DOCUMENTS

| JP | 2007196795 | A |   | 8/2007 |
|----|------------|---|---|--------|
| KR | 20130012730 | A | * | 2/2013 |

\* cited by examiner

PEDESTRIAN PROTECTING DEVICE

TECHNICAL FIELD

The present invention relates to a pedestrian protecting device configured to protect a pedestrian who has collided with a vehicle.

BACKGROUND ART

A vehicle equipped with a pedestrian protecting device configured to protect a pedestrian when the vehicle has collided with the pedestrian is being developed in recent years. Known as this type of pedestrian protecting device is, for example, a device configured to expand and deploy (hereinafter simply referred to as "deploy") a pair of right and left air bags from a rear end portion of a hood and absorb an impact received by the pedestrian (PTL 1). PTL 2 proposes a pedestrian protecting device configured such that: right and left air bags are formed such that tip end portions of the right and left air bags vertically overlap, i.e., vehicle middle-side end portions of the right and left air bags vertically overlap; and with this, the right and left air bags are deployed without forming a gap between the right and left air bags. According to this pedestrian protecting device, since the pedestrian is prevented from getting into the gap between the right and left air bags, this is effective for improving pedestrian impact absorption performance.

CITATION LIST

Patent Literature

PTL 1: Japanese Laid-Open Patent Application Publication No. 2006-44289
PTL 2: Japanese Laid-Open Patent Application Publication No. 2007-196795

SUMMARY OF INVENTION

Technical Problem

In the pedestrian protecting device as in PTL 2, each of the tip end portions of the right and left air bags has an asymmetrical shape, and a predetermined one of the air bags is always located at an upper side. However, a position at which the air bag receives the pedestrian and a direction in which the air bag receives the pedestrian differ depending on a pedestrian collision position of the vehicle. Therefore, according to the pedestrian protecting device of PTL 2 in which the predetermined one of the air bags is always located at the upper side, the tip end of the air bag located at the upper side may be lifted up, and the air bag may not adequately absorb the impact of the pedestrian. Thus, there is still room for improvement in this regard.

The present invention was made under these circumstances, and an object of the present invention is to provide a technology of being able to further improve pedestrian impact absorption performance of a pedestrian protecting device.

Solution to Problem

To solve the above problems, the present invention is a pedestrian protecting device mounted on a vehicle, the vehicle including a windshield and a hood, the hood being located in front of the windshield and covering an engine, the pedestrian protecting device including: a right air bag device including a right air bag configured to be deployed at a region spreading from a rear end portion of the hood to the windshield and located mainly at a right side of the vehicle; a left air bag device including a left air bag configured to be deployed at a region spreading from the rear end portion of the hood to the windshield and located mainly at a left side of the vehicle; a collision position detector configured to detect a pedestrian collision position of the vehicle in a vehicle width direction; a controller configured to control operations of the air bags, wherein: the right and left air bags include respective tip end portions which vertically overlap each other at a middle portion of the vehicle in the vehicle width direction when the right and left air bags are deployed; and the controller executes a time difference deployment control operation of, when the pedestrian collision position detected by the collision position detector is located at a left side of the middle portion of the vehicle in the vehicle width direction, operating the air bag devices such that a deployment of the right air bag is completed before a deployment of the left air bag is completed, and when the pedestrian collision position is located at a right side of the middle portion of the vehicle, operating the air bag devices such that the deployment of the left air bag is completed before the deployment of the right air bag is completed.

According to this configuration, the air bag located closer to the pedestrian collision position out of the right and left air bags overlaps an upper side of the air bag located farther from the pedestrian collision position. Therefore, the air bag located at an upper side when receiving the pedestrian is hardly lifted up, and thus, the pedestrian can be more surely received by the air bag. As a result, the pedestrian impact absorption performance improves.

In this case, it is preferable that: when the pedestrian collision position detected by the collision position detector is located at the right or left side of the middle portion of the vehicle in the vehicle width direction, the controller estimate a vehicle width direction position at which the vehicle is likely to receive the pedestrian; and when the estimated position is located at the middle portion of the vehicle, the controller execute the time difference deployment control operation.

To be specific, a phenomenon in which the air bag at an upper side is lifted up when receiving the pedestrian tends to occur especially when the pedestrian who has collided with the vehicle is received by the air bags while relatively moving toward the middle portion of the vehicle from a position outside the middle portion in the vehicle width direction. Therefore, according to the above configuration, the time difference deployment control operation can be reasonably executed.

In this case, it is preferable that: the vehicle include a steering angle sensor configured to detect a steering angle and steering direction of a steering wheel of the vehicle; and the controller execute the time difference deployment control operation when i) the pedestrian collision position detected by the collision position detector is located at the right side of the middle portion of the vehicle in the vehicle width direction, ii) the steering direction is a right direction, and iii) the steering angle is a predetermined threshold or more or when i) the pedestrian collision position detected by the collision position detector is located at the left side of the middle portion of the vehicle in the vehicle width direction, ii) the steering direction is a left direction, and iii) the steering angle is the predetermined threshold or more.

According to this configuration, it is possible to more accurately estimate that the pedestrian collision position is located at the right or left side of the middle portion in the vehicle width direction, and the position at which the vehicle is likely to receive the pedestrian is located at the middle portion.

It is preferable that: in the above pedestrian protecting device, each of the tip end portions of the air bags has a tapered shape that gradually decreases in vertical thickness in the vehicle width direction; and each of the tip end portions of the air bags uniformly changes in thickness with respect to a thickness direction middle portion of the tip end portion of the air bag.

According to this configuration, in both cases where the right air bag is located at an upper side and where the left air bag is located at an upper side, the tip end portions of the air bags can appropriately overlap each other. Therefore, this configuration is useful for the time difference deployment control operation.

Advantageous Effects of Invention

As explained above, according to the pedestrian protecting device of the present invention, the pedestrian impact absorption performance can be further improved.

BRIEF DESCRIPTION OF DRAWINGS

FIG. 5A shows that the air bags are deploying, and FIG. 5B shows that the deployments of the air bags are completed.

FIG. 6A shows that the air bags are deploying, and FIG. 6B shows that the deployments of the air bags are completed.

DESCRIPTION OF EMBODIMENTS

Hereinafter, a preferred embodiment of the present invention will be explained in detail with reference to the attached drawings.

Entire Configuration

Figure 1:
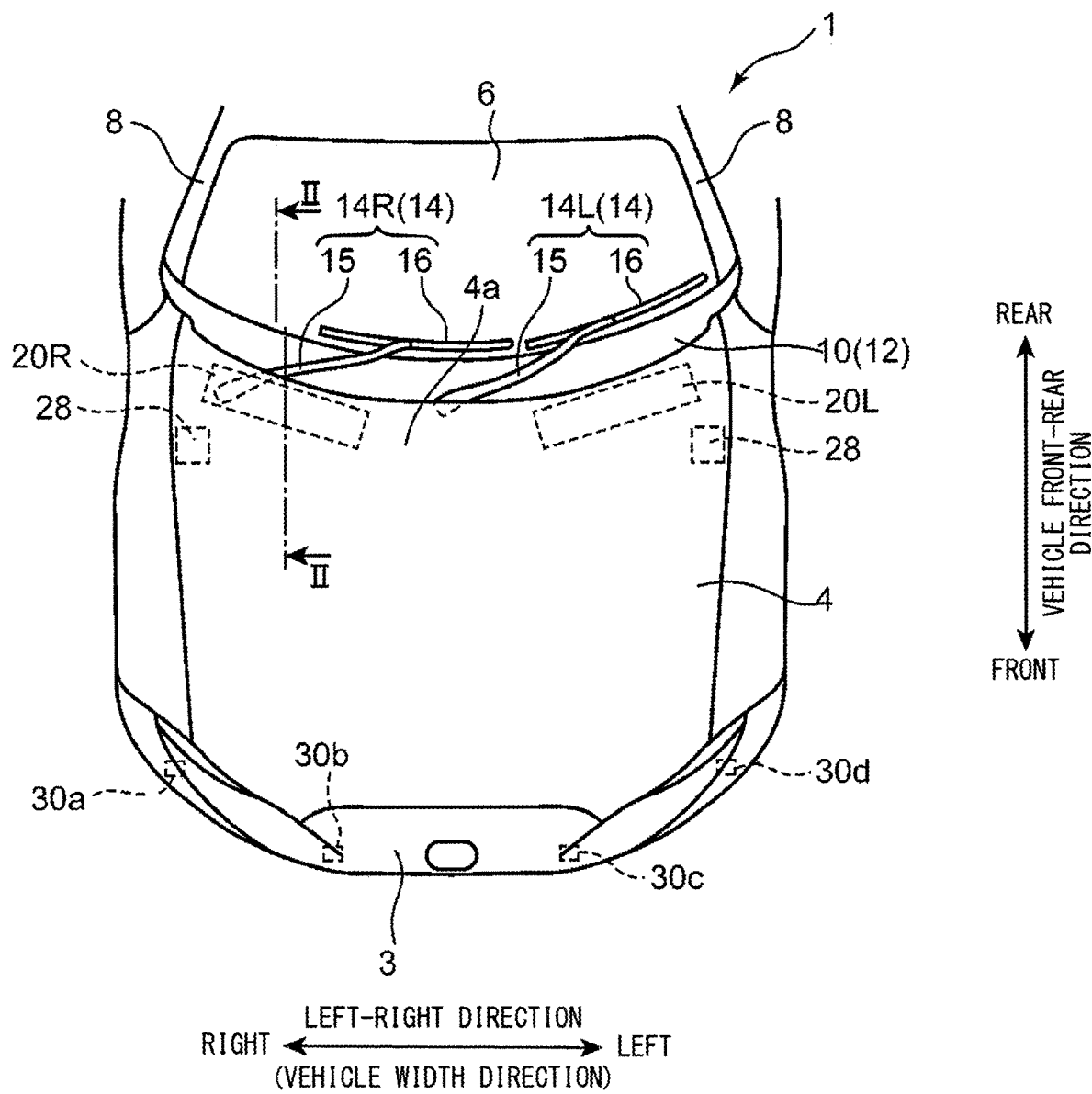
FIG. 1 is a plan view showing a vehicle (automobile) equipped with a pedestrian protecting device according to the present invention.
Figure 2:
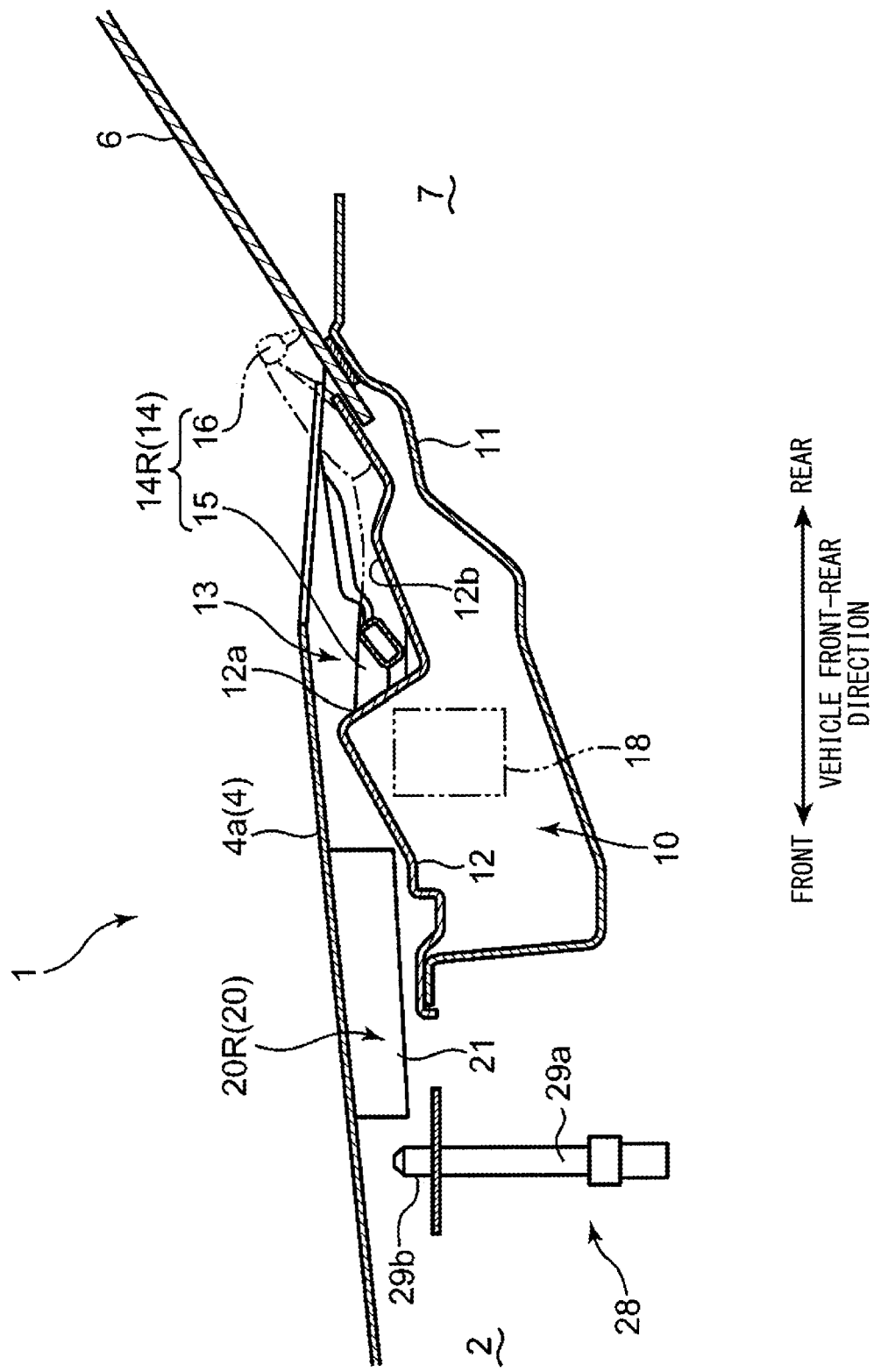
FIG. 2 is a sectional view of the vehicle (a sectional view taken along line II-II of FIG. 1).

FIG. 1 is a plan view showing a vehicle 1 equipped with a pedestrian protecting device according to the present invention. FIG. 2 is a sectional view of the vehicle 1 (a sectional view taken along line II-II of FIG. 1). The vehicle 1 is a right-hand drive automobile including a driver's seat at a right side and a front passenger seat at a left side.

As shown in FIGS. 1 and 2, the vehicle 1 includes: a hood 4 (also called a hood panel) covering an engine room 2 located at a front portion of the vehicle 1; a bumper face 3 provided in front of the engine room 2; a windshield 6 covering a vehicle room 7 located behind the engine room 2; and a cowl portion 10 located in front of the windshield 6.

Figure 4:
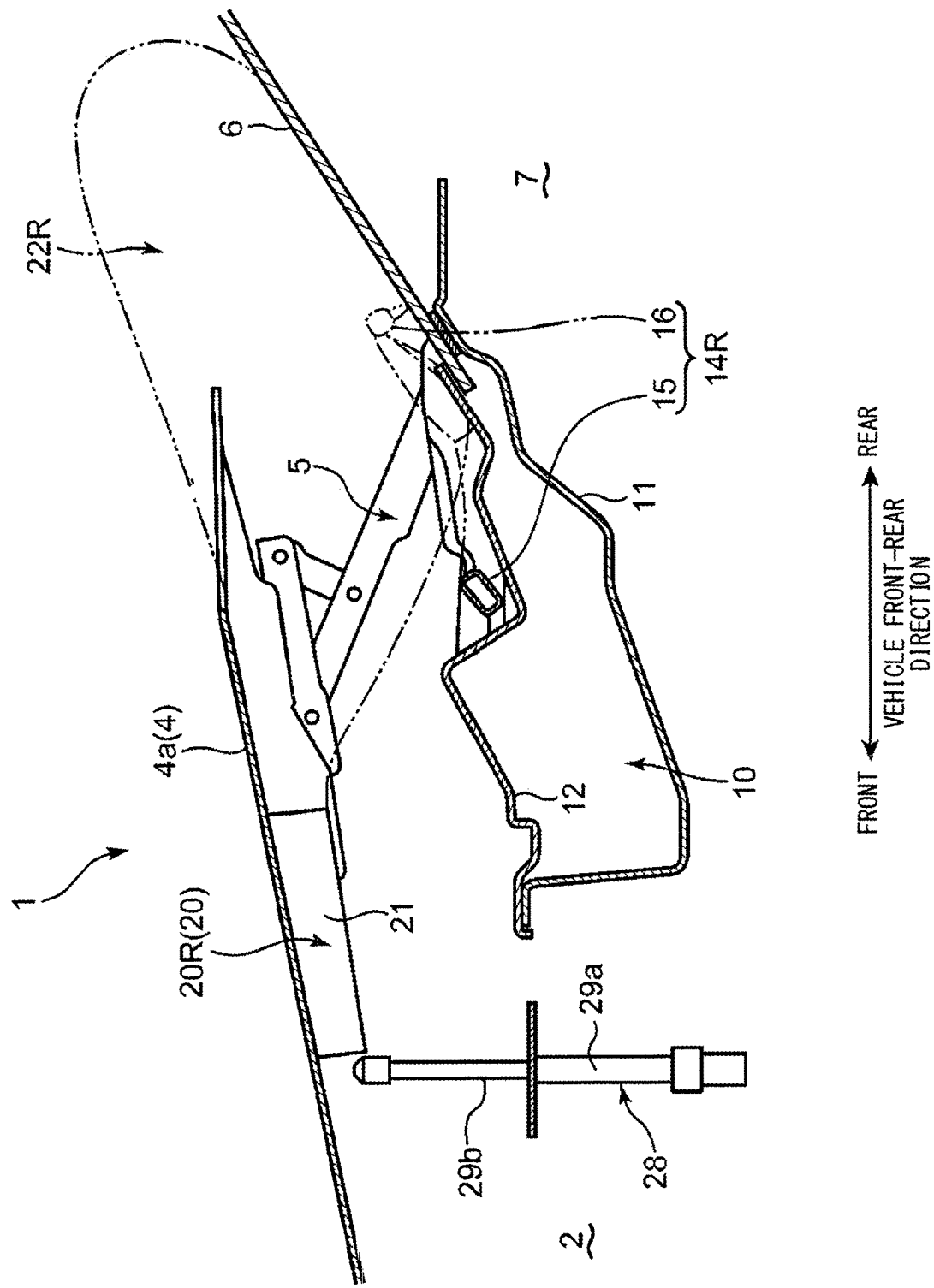
FIG. 4 is a sectional view of the vehicle (a sectional view taken along line IV-IV of FIG. 3).

The hood 4 is provided at the front portion of the vehicle 1. The hood 4 is constituted by one or a plurality of panels made of an aluminum alloy and is configured to be relatively easily deformable with respect to a collision from outside. The hood 4 is supported by a vehicle body at both right and left end positions of a rear end portion 4a through hinge mechanisms 5 (see FIG. 4) so as to be openable and closable. Normally, the hinge mechanisms 5 couple the rear end portion 4a and the vehicle body such that the hood 4 opens and closes at a front side. On the other hand, when below-described pop-up actuators 28 are operated by collision with a pedestrian, the hinge mechanisms 5 receive push-up force, applied by the pop-up actuators 28 from below, to deform as shown in FIG. 4, and thus, allows flip-up (pop-up) of the rear end portion 4a of the hood 4. With this configuration, in the collision with the pedestrian, the deformation of the hood 4 is promoted by the formation of an adequate space under the hood 4, and thus, impact applied to the pedestrian is eased.

Both right and left ends of the windshield 6 are supported by A-pillars 8 each of which is a part of the vehicle body. A front end portion of the windshield 6 is supported by the vehicle body through a sealing member and a cowl panel 11.

The cowl portion 10 is constituted by the cowl panel 11 and a cowl grill 12 arranged at an upper side of the cowl panel 11. A wiper device 14 is provided at the cowl portion 10.

The wiper device 14 includes a right wiper 14R, a left wiper 14L, and a drive mechanism. The right wiper 14R is arranged at the driver's seat side and mainly wipes a region spreading from a middle portion of the windshield 6 to a right side. The left wiper 14L is arranged at the front passenger seat side and mainly wipes a region spreading from the middle portion of the windshield 6 to a left side. The drive mechanism is arranged under the cowl grill 12.

Although not shown in detail, the drive mechanism includes a pair of pivots, an electric motor 18, and a crank mechanism. The pair of pivots are rotatably supported by the cowl grill 12. The crank mechanism transmits rotational driving force of the electric motor 18 to each of the pivots while converting the rotational driving force into a repetitive motion of forward rotation and reverse rotation of the pivot. The right wiper 14R is coupled to one of the pivots, and the left wiper 14L is coupled to the other pivot. With this, the wipers 14R and 14L swing (turn) in the same direction in sync with each other.

Each of the wipers 14R and 14L includes: a wiper arm 15 having a base end portion fixed to the pivot; and a wiper blade 16 coupled to a tip end portion of the wiper arm 15. A turning fulcrum of the right wiper 14R, i.e., the base end portion (pivot) of the wiper arm 15 is located near a vehicle width direction right end portion, and a turning fulcrum of the left wiper 14L is located at a vehicle width direction middle portion. When the wiper device 14 is not in use, the wipers 14R and 14L are arranged at predetermined storage positions (positions shown in FIG. 1), i.e., the wiper blade 16 of the right wiper 14R is located at the vehicle width direction middle portion along a boundary line between the windshield 6 and the cowl grill 12, and the wiper blade 16 of the left wiper 14L is located at a left side of the wiper blade 16 of the right wiper 14R in line with the wiper blade 16 of the right wiper 14R along the boundary line.

As shown in FIG. 2, level difference portions 13 are formed at respective portions of the cowl grill 12 which portions correspond to respective movable regions of the wipers 14R and 14L (wiper arms 15). Rear sides of the level difference portions 13 are located lower than front sides of the level difference portions 13. The right and left wipers 14R and 14L are provided at the respective level difference portions 13.

A pedestrian air bag device 20 is provided between the rear end portion 4a of the hood 4 and the cowl portion 10. The pedestrian air bag device 20 includes a right air bag device 20R and a left air bag device 20L. The right air bag device 20R is fixed to a position on a rear surface of a region, located at a right side of the vehicle width direction middle portion, of the rear end portion 4a of the hood 4, the position being opposed to the base end portion of the wiper arm 15 of the right wiper 14R as shown in FIG. 1. The left air bag device 20L is arranged at a position on a rear surface of a region, located at a left side of the vehicle width direction middle portion, of the rear end portion 4a of the hood 4, and the position of the left air bag device 20L and the position of the right air bag device 20R are bilaterally symmetrical.

Each of the air bag devices 20R and 20L includes: an air bag 22 (22R, 22L); a casing 21 accommodating the air bag 22 (22R, 22L) in a folded state; and an inflator (not shown) configured to supply gas for deployment (expansion) to the air bag 22 (22R, 22L).

Figure 3:
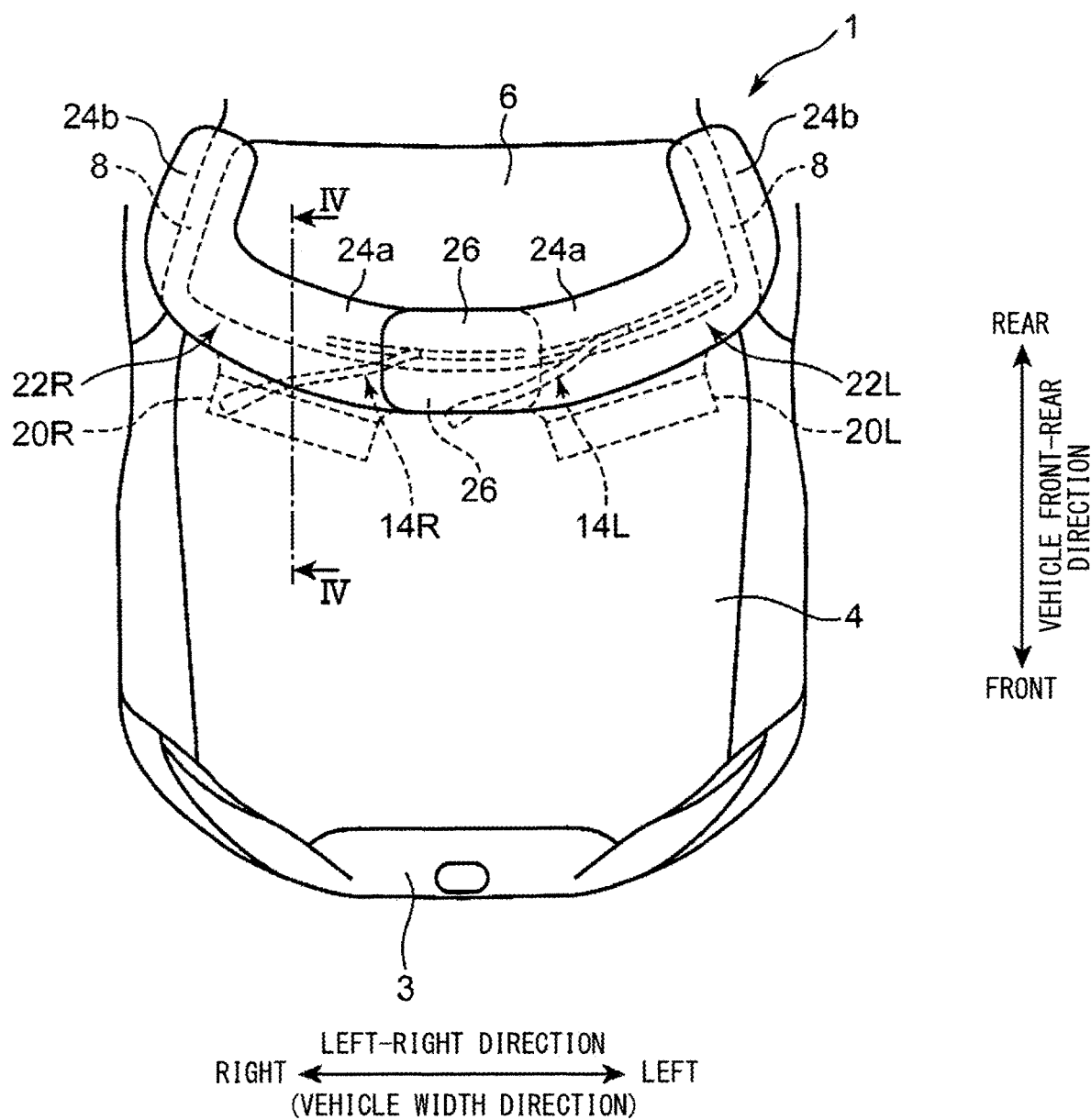
FIG. 3 is a plan view of the vehicle when air bag devices and pop-up actuators are operated.

FIG. 3 is a plan view of the vehicle 1 when the air bag devices 20R and 20L and the pop-up actuators 28 are operated. FIG. 4 is a sectional view of the vehicle 1 (a sectional view taken along line IV-IV of FIG. 3).

As shown in FIG. 3, the air bag 22R (called a right air bag 22R) of the right air bag device 20R is deployed mainly in a region spreading from the vehicle width direction middle portion to a right side (driver's seat side), and the air bag 22L (called a left air bag 22L) of the left air bag device 20L is deployed mainly in a region spreading from the vehicle width direction middle portion to a left side (front passenger seat side). With this, the air bags can widely cover a rear side of the hood 4 all over in a vehicle width direction.

More specifically, the right air bag 22R has an L shape including: an air bag base portion 24a extending in the vehicle width direction along the cowl portion 10; and an air bag side portion 24b extending upward from a right end of the air bag base portion 24a along the right A-pillar 8. The left air bag 22L and the right air bag 22R are bilaterally symmetrical in shape in a plan view, i.e., the left air bag 22L has an inverted L shape including: an air bag base portion 24a extending in the vehicle width direction along the cowl portion 10; and an air bag side portion 24b extending upward from a left end of the air bag base portion 24a along the left A-pillar 8.

As shown in FIG. 3, the air bag base portions 24a of the air bags 22R and 22L are formed so as to vertically overlap each other at the vehicle width direction middle portion of the windshield 6 and the vehicle width direction middle portion of the cowl portion 10 while the air bag base portions 24a maintain a constant thickness of as a whole.

Figure 5A:
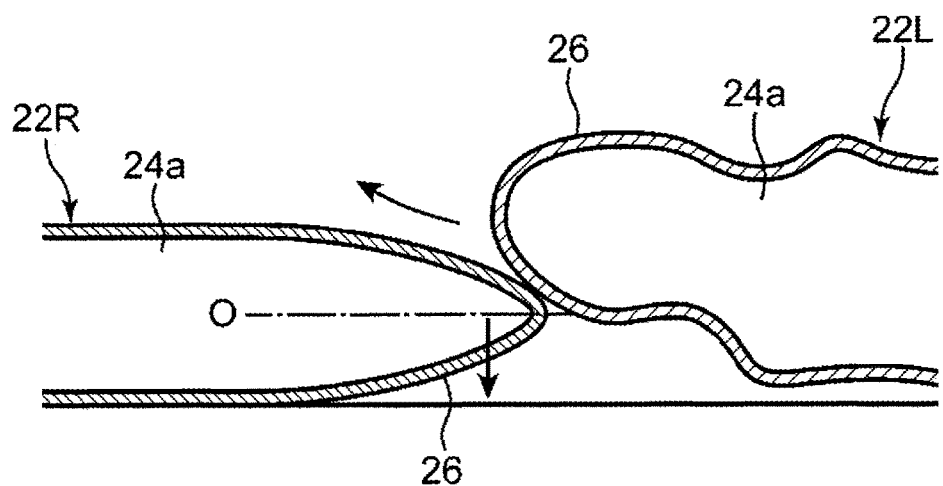
FIGS. 5A and 5B are schematic sectional views of the vehicle for explaining a process of deployments of air bags when a right air bag device is operated first.
Figure 5B:
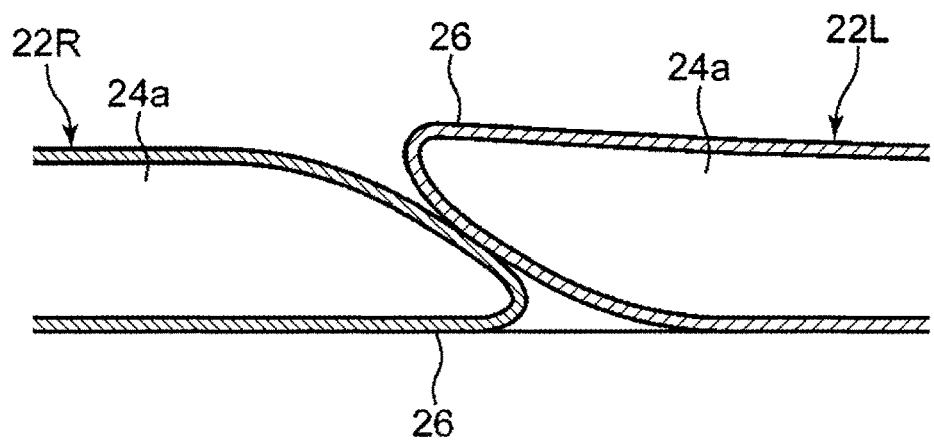
Figure 6A:
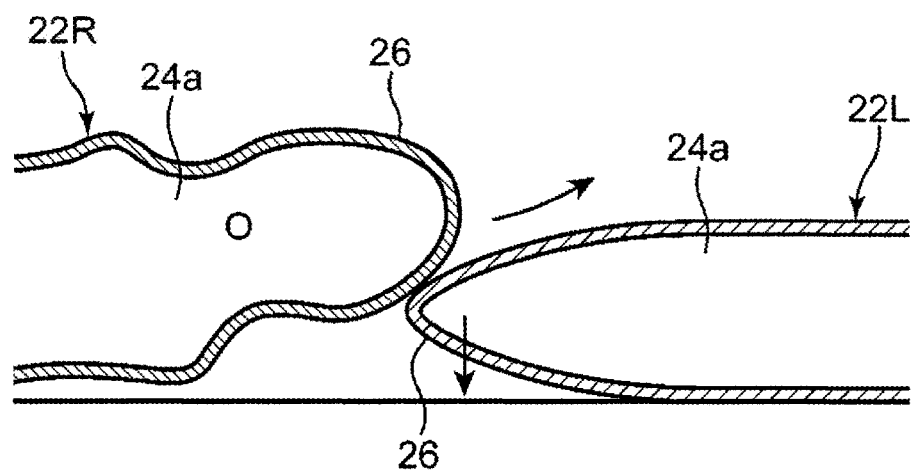
FIGS. 6A and 6B are schematic sectional views of the vehicle for explaining a process of the deployments of the air bags when a left air bag device is operated first.
Figure 6B:
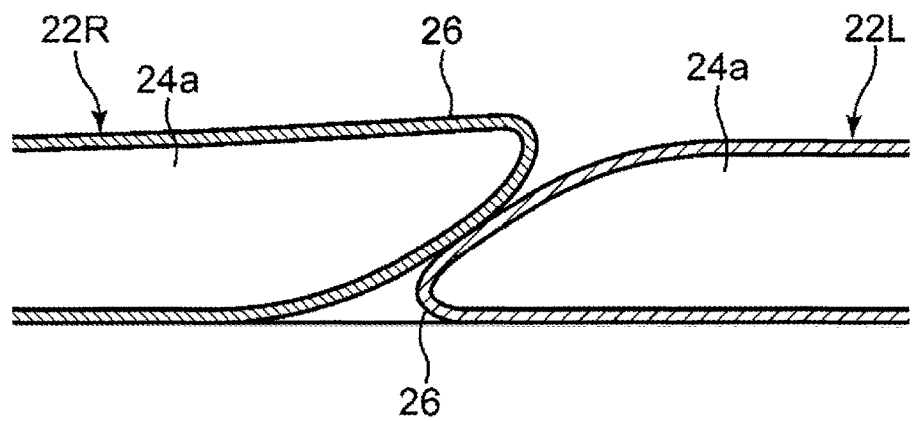

As shown in FIG. 5A, a tip end portion (left end portion) 26 of the air bag base portion 24a of the right air bag 22R has a tapered shape that gradually decreases in thickness from a right side toward a left side, specifically, that gradually decreases in thickness uniformly with respect to a center line O extending through a thickness direction center. As shown in FIG. 6A, a tip end portion (right end portion) 26 of the air bag base portion 24a of the left air bag 22L and the tip end portion (left end portion) 26 of the air bag base portion 24a of the right air bag 22R are bilaterally symmetrical, and the tip end portion (right end portion) 26 of the air bag base portion 24a of the left air bag 22L has the same tapered shape as the tip end portion 26 of the right air bag 22R. With this configuration, as shown in FIGS. 5A, 5B, 6A, and 6B, even when the tip end portion 26 of any of the right and left air bags 22R and 22L is located at an upper side, the tip end portions 26 of the air bags 22R and 22L overlap each other at the vehicle width direction middle portion without problems.

Each of the air bags 22R and 22L is formed such that when the air bag is deployed, a portion of the air bag other than the tip end portion 26 has a substantially constant thickness. The tip end portions 26 of the air bag base portions 24a are formed such that a thickness of the overlapping tip end portions 26 is substantially equal to the thickness of the other portion (portion of the air bag other than the tip end portion 26). With this, the deployed air bags 22R and 22L have a substantially constant thickness as a whole.

The pop-up actuators 28 configured to perform the pop-up of the hood 4 are provided in the engine room 2 in front of the respective air bag devices 20R and 20L. Each of the pop-up actuators 28 includes: an actuator main body portion 29a in which an inflator (not shown) is incorporated; and a rod 29b supported by the actuator main body portion 29a so as to be projectable upward. When below-described G sensors 30a-30b detect collision with the pedestrian, the inflator operates, and as shown in FIG. 4, the rod 29b projects from the actuator main body portion 29a to perform the pop-up of the hood 4. Although not shown in FIGS. 2 and 4, a reinforced portion is provided at the rear surface of the hood 4, and the rod 29b pushes up the hood 4 through the reinforced portion from below.

The air bag devices 20R and 20L and the pop-up actuator 28 operate when the vehicle 1 collides with the pedestrian. The collision is detected by the four G sensors 30a-30d (corresponding to a collision position detector of the present invention) arranged at a rear side of the bumper face 3. Each of the G sensors 30a-30d detects acceleration or deceleration generated in a front-rear direction of the vehicle 1 by the application of a collision load and outputs a detection signal to a below-described ECU 40. The G sensors 30a-30d are attached to a bracket arranged close to a rear side of the bumper face 3 and extending in the vehicle width direction. With this, even when the vehicle 1 and the pedestrian collide with each other at a position between the adjacent sensors, a pedestrian collision position can be accurately detected by acceleration or deceleration generated at the bracket.

Control System

Figure 7:
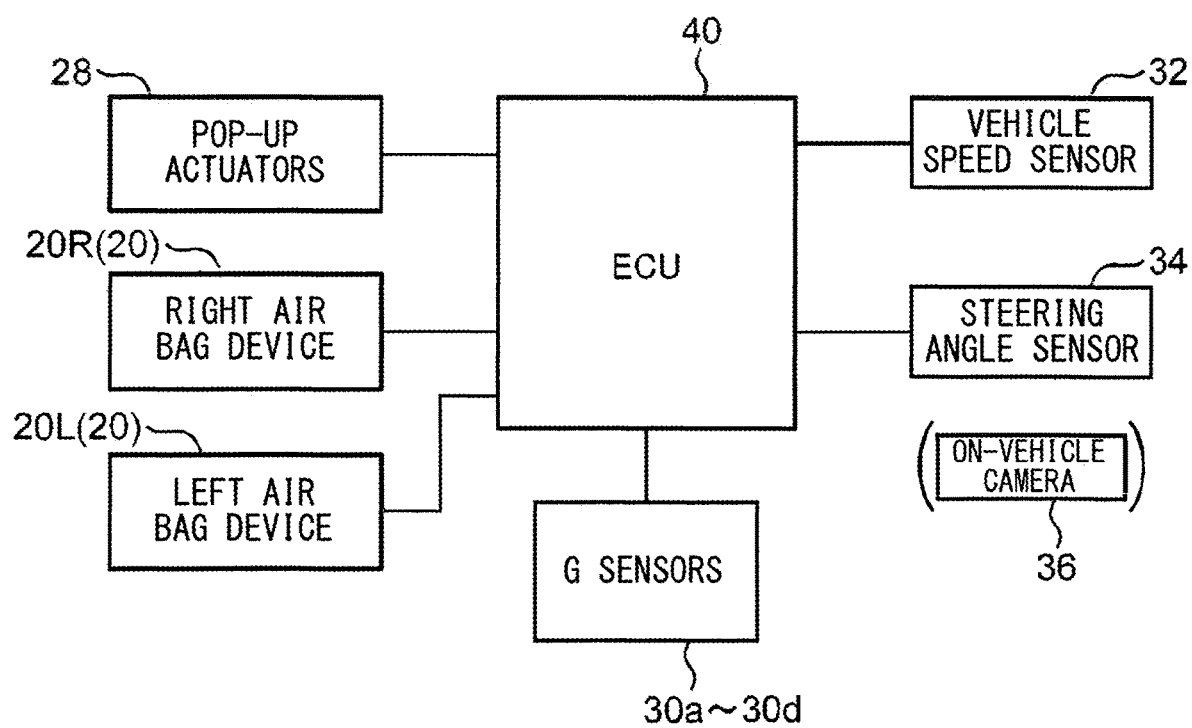
FIG. 7 is a block diagram showing a control system of the vehicle.

FIG. 7 is a block diagram showing a control system of the vehicle 1. This block diagram shows portions of the control system of the vehicle 1 which portions mainly control operations of the pedestrian air bag device 20 (the right air bag device 20R and the left air bag 22L) and the pop-up actuators 28.

The vehicle 1 includes an ECU (Electronic Control Unit) 40 configured to integrally control the vehicle 1. As is well known, the ECU 40 is constituted by a microprocessor including a CPU, a ROM, a RAM, etc. The ECU 40 corresponds to a controller of the present invention.

Various information pieces are input to the ECU 40 from a plurality of sensors provided at the vehicle. The following will explain matters necessary to explain the present invention. As shown in FIG. 7, the vehicle 1 is provided with: a vehicle speed sensor 32 configured to detect the speed of the vehicle 1; a steering angle sensor 34 configured to detect a steering angle and steering direction of a steering wheel (not shown); and the above-described G sensors 30a-30d. The signals from the sensors 30a-30d, 32, and 34 are input to the ECU 40.

The ECU 40 is electrically connected to the pop-up actuators 28 and the air bag devices 20R and 20L and outputs drive control signals to the pop-up actuators 28 and the air bag devices 20R and 20L. To be specific, the ECU 40 controls the operations of the pop-up actuators 28 and the air bag devices 20R and 20L based on the input signals from the sensors 30a-30d, 32, and 34 and performs processing, such as various calculations and determinations, associated with the control of the above operations. Especially when the vehicle 1 has collided with the pedestrian, as described below, the ECU 40 estimates based on parameters, such as the collision position, a car width direction position at which the vehicle is likely to receive the pedestrian and determines an operation target from the right and left air bag devices 20R and 20L and an operation timing of the operation target. Based on these results, the ECU 40 controls the operations of the air bag devices 20R and 20L.

Figure 8:
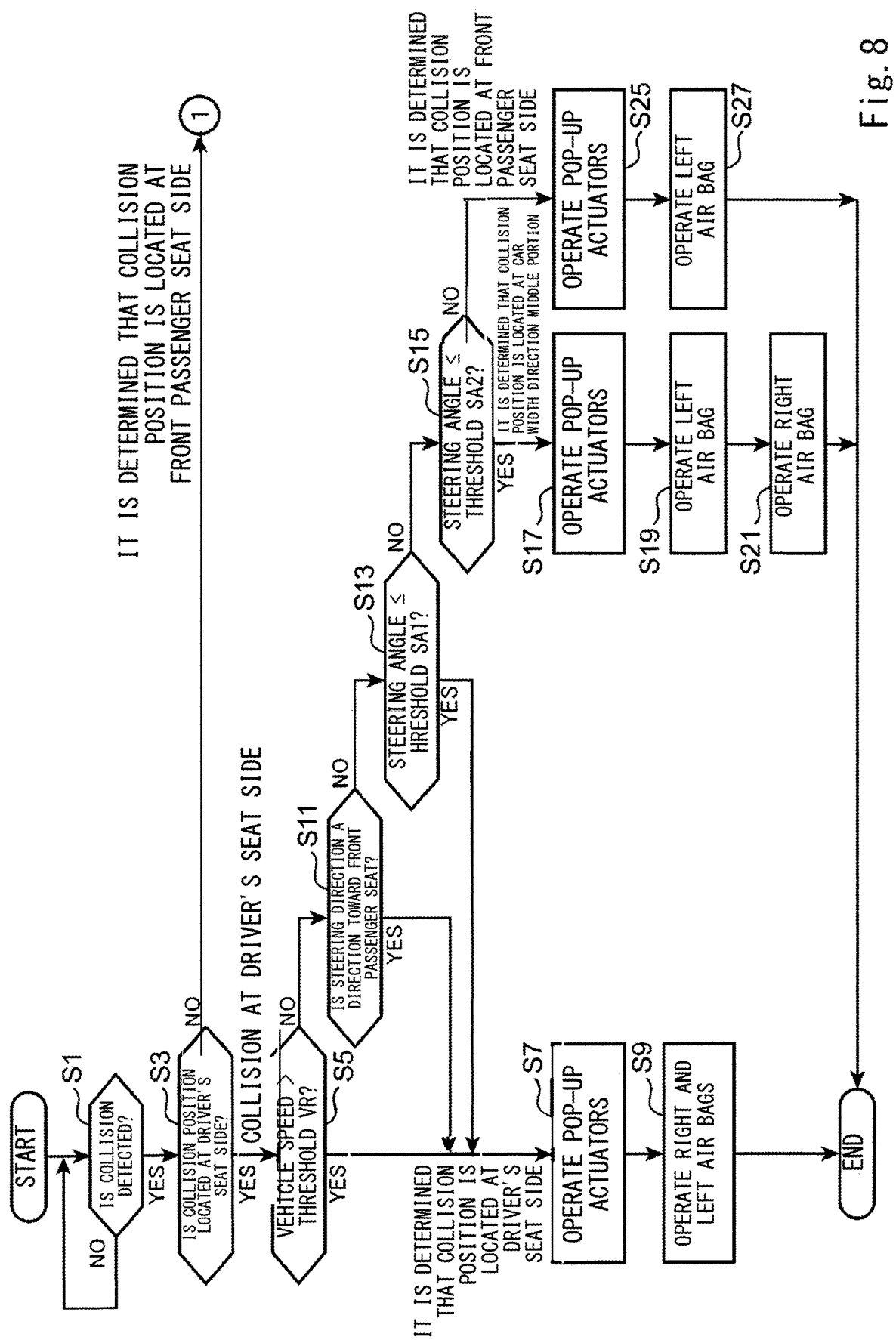
FIG. 8 is a flow chart showing one example of control of the pop-up actuators and a pedestrian air bag device.
Figure 9:
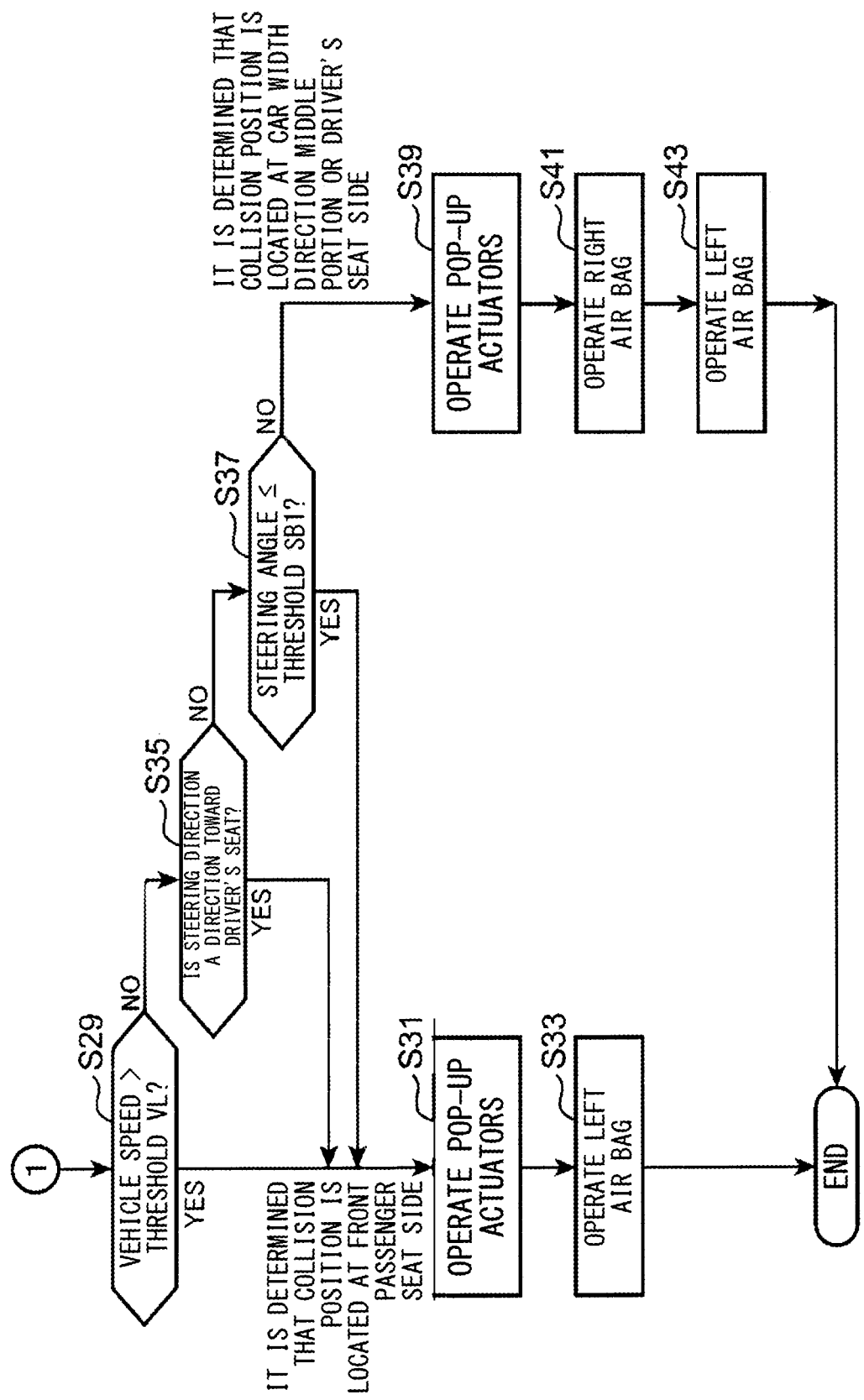
FIG. 9 is a flow chart showing one example of the control of the pop-up actuators and the pedestrian air bag device.

Next, the control of the pop-up actuators 28 and the air bag devices 20R and 20L by the ECU 40 will be explained with reference to FIGS. 8 and 9. Each of FIGS. 8 and 9 is a flow chart showing one example of the control of the pop-up actuators and the pedestrian air bag device.

When the flow chart starts, the ECU 40 receives the signals form the sensors 30a-30d, 32, and 34 and determines whether or not the vehicle 1 has collided with the pedestrian (Step S1). To be precise, whether the vehicle 1 has collided with the pedestrian or an object is unknown. However, for convenience sake, this example will explain a case where the pedestrian collides with the vehicle 1.

When it is determined that the vehicle 1 has collided with the pedestrian (Yes in Step S1), the ECU 40 determines based on the input signals from the G sensors 30a-30d whether or not the pedestrian collision position is located at the driver's seat side, to be specific, whether or not the collision position is located at a right side of the middle portion of the vehicle 1 (bumper face 3) in the vehicle width direction (Step S3). If Yes in Step S3, the ECU 40 determines based on the input signal from the vehicle speed sensor 32 whether or not the vehicle speed is higher than a predetermined threshold VR (Step S5).

When it is determined that the vehicle speed is higher than the threshold VR, the ECU 40 operates the pop-up actuators 28 and the air bag devices 20R and 20L in this order (Steps S7 and S9). With this, the pop-up of the hood 4 is performed, and the right and left air bags 22R and 22L are simultaneously deployed at a timing at which the pop-up is started. Thus, the flow chart ends.

In contrast, if No in Step S5, the ECU 40 determines based on the input signal from the steering angle sensor 34 whether or not the steering direction is a direction toward the front passenger seat, i.e., whether or not the steering wheel is turned to the left (Step S11). If Yes in Step S11, the process proceeds to Step S7. Then, as described above, the pop-up of the hood 4 is performed, and the right and left air bags 22R and 22L are simultaneously deployed.

If No in Step S11, i.e., when it is determined that the steering direction is a direction toward the driver's seat (the steering wheel is turned to the right), the ECU 40 determines whether or not the steering angle is not more than a predetermined threshold SA1 (Step S13). If Yes in Step S13, the process proceeds to Step S7. Then, as described above, the pop-up of the hood 4 is performed, and the right and left air bags 22R and 22L are simultaneously deployed.

If No in Step S13, the ECU 40 determines whether or not the steering angle is in a range of more than the threshold SA1 and not more than a threshold SA2 (SA2>SA1) (Step S15). If Yes in Step S15, the ECU 40 operates the pop-up actuators 28, the left air bag 22L, and the right air bag 22R in this order (Steps S17-S21). With this, the pop-up of the hood 4 is performed, and the left air bag 22L is deployed at a timing at which the pop-up is started. Slightly after this timing, the right air bag 22R is deployed. Thus, the flow chart ends.

In contrast, if No in Step S15, the ECU 40 operates the pop-up actuators 28 and the left air bag 22L in this order (Steps S25 and S27). With this, the pop-up of the hood 4 is performed, and only the left air bag 22L is deployed at a timing at which the pop-up is started. Thus, the flow chart ends.

Figure 10:
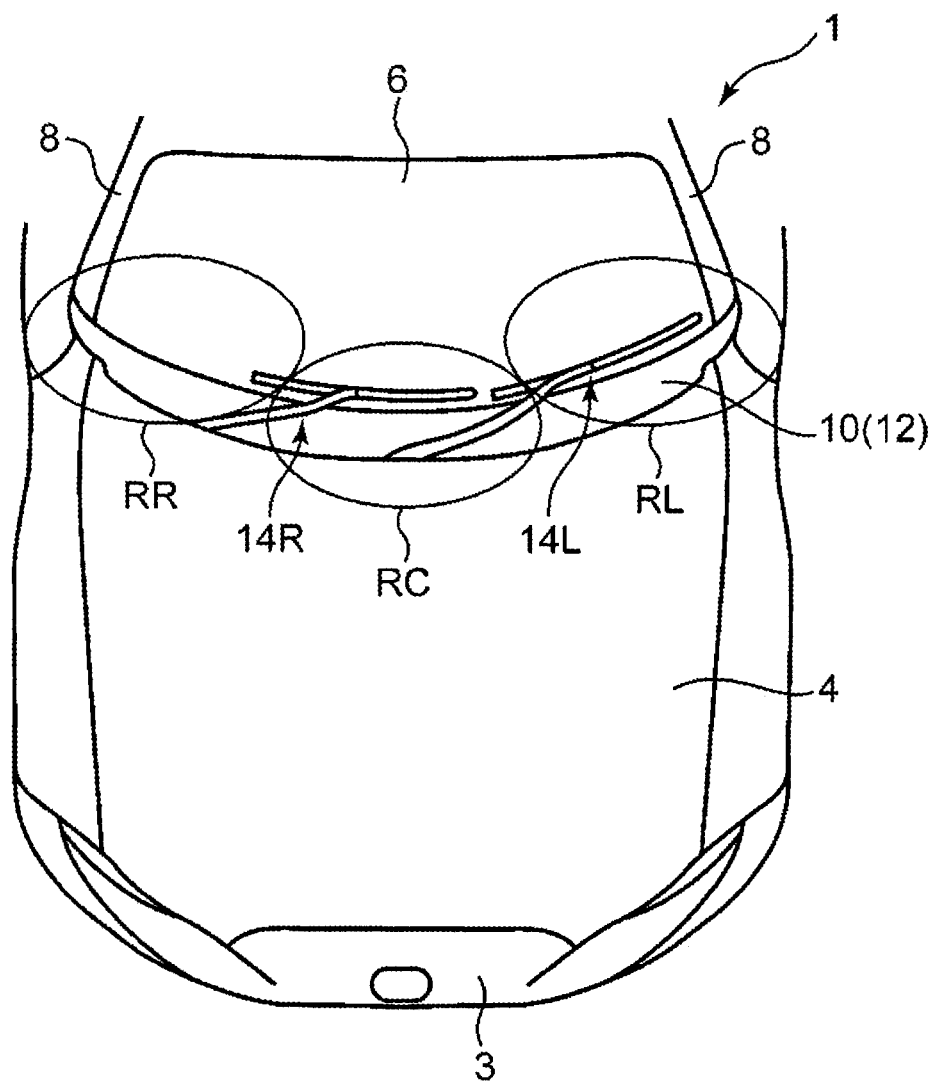
FIG. 10 is an explanatory diagram of a position at which a pedestrian is received.

To be specific, when the pedestrian has collided with the right side of the middle portion of the vehicle 1, and i) the vehicle speed is higher than the threshold VR (Yes in Step S5), ii) the vehicle speed is not more than the threshold VR, and the steering direction is a direction toward the front passenger seat (Yes in Step S11), or iii) the vehicle speed is not more than the threshold VR, and the steering direction is a direction toward the driver's seat, and the steering angle is not more than the threshold SA1 (Yes in Step S13), it is estimated that the pedestrian who has collided with the vehicle 1 substantially linearly moves from the collision position toward a vehicle rear side and is received at a region RR (hereinafter referred to as a right region RR; see FIG. 10) located at the right side of the middle portion of the vehicle 1. Therefore, the ECU 40 determines both the air bags 22R and 22L (air bag devices 20R and 20L) as the operation targets and simultaneously operates the right and left air bag devices 20R and 20L (Steps S7 and S9). In this example, the right and left air bags 22R and 22L are simultaneously deployed. However, the right air bag 22R may be deployed before the left air bag 22L is deployed.

In contrast, iv) when the steering direction is a direction toward the driver's seat, and the steering angle is in a range of more than the threshold SA1 and not more than the threshold SA2 (Yes in Step S15), it is estimated that the pedestrian who has collided with the vehicle 1 is received at a region RC (middle portion region RC) of the middle portion of the vehicle 1. Therefore, the ECU 40 determines both the air bags 22R and 22L (air bag devices 20R and 20L) as the operation targets and operates the left air bag device 20L and the right air bag device 20R in this order (Steps S19 and S21). To be specific, in this case, it is estimated that the pedestrian is received by the air bags 22R and 22L while relatively moving from the right side of the vehicle 1 toward the middle portion of the vehicle 1. Therefore, to prevent the air bag at the upper side from being lifted up when receiving the pedestrian, the operations of the air bag devices 20R and 20L are controlled such that: the left air bag 22L is first deployed before the right air bag 22R is deployed; and the tip end portion 26 of the right air bag 22R overlaps an upper side of the tip end portion 26 of the left air bag 22L.

Further, v) when the steering direction is a direction toward the driver's seat, and the steering angle is larger than the threshold SA2 (No in Step S15), it is estimated that the pedestrian who has collided with the vehicle 1 moves from the right side of the vehicle 1 to a region RL (left region RL) located at the left side of the middle portion of the vehicle 1 and is received at the left region RL. Therefore, the ECU 40 determines only the left air bag 22L (left air bag device 20L) as the operation target and deploys only the left air bag 22L (Step S27). By deploying the left air bag 22L as above, the function of the pedestrian air bag device 20 which function is to receive the pedestrian by the air bag is achieved. In addition, the deployment of the right air bag 22R is prohibited, and with this, the field of view of a driver is secured, and for example, the vehicle can be safely stopped.

In contrast, if No in Step S3, to be specific, when it is determined that the pedestrian collision position is located at the front passenger seat side (at the left side of the vehicle middle portion), the ECU 40 determines whether or not the vehicle speed is higher than a predetermined threshold VL (Step S29).

When it is determined that the vehicle speed is higher than the threshold VL, the ECU 40 operates the pop-up actuators 28 and the left air bag 22L in this order (Steps S31 and S33). With this, the pop-up of the hood 4 is performed, and only the left air bag 22L is deployed at a timing at which the pop-up is started. Thus, the flow chart ends.

In contrast, if No in Step S29, the ECU 40 determines whether or not the steering direction is a direction toward the driver's seat, i.e., whether or not the steering wheel is turned to the right (Step S35). If Yes in Step S35, the process proceeds to Step S31. Then, as described above, the pop-up of the hood 4 is performed, and only the left air bag 22L is deployed.

If No in Step S35, to be specific, when it is determined that the steering direction is a direction toward the front passenger seat (the steering wheel is turned to the left), the ECU 40 determines whether or not the steering angle is not more than a predetermined threshold SB1 (Step S37). If Yes in Step S37, the process proceeds to Step S31. Thus, the pop-up of the hood 4 is performed, and only the left air bag 22L is deployed.

In contrast, if No in Step S37, the ECU 40 operates the pop-up actuators 28, the right air bag 22R, and the left air bag 22L in this order (Steps S39-S43). With this, the pop-up of the hood 4 is performed, and the right air bag 22R is deployed at a timing at which the pop-up is started. Slightly after this timing, the left air bag 22L is deployed. Thus, the flow chart ends.

To be specific, when the pedestrian has collided with the left side of the middle portion of the vehicle 1, and
  vi) the vehicle speed is higher than the threshold VL (Yes in Step S29),
  vii) the vehicle speed is not more than the threshold VL, and the steering direction is a direction toward the driver's seat (Yes in Step S35), or
  viii) the steering direction is a direction toward the front passenger seat, and the steering angle is not more than the threshold SB1 (Yes in Step S37),
    it is estimated that the pedestrian who has collided with the vehicle 1 substantially linearly moves from the collision position toward the vehicle rear side and is received at the left region RL (see FIG. 10) of the vehicle 1. Therefore, the ECU 40 determines only the left air bag 22L (left air bag device 20L) as the operation target and deploys only the left air bag 22L (Step S27). By deploying only the left air bag 22L as above, as with the control (Steps S25 and S27) described in the above item v), the function of the pedestrian air bag device 20 which function is to receive the pedestrian by the air bag is achieved. In addition, the deployment of the right air bag 22R is prohibited, and with this, the field of view of the driver is secured, and the vehicle can be safely stopped.

In contrast, ix) when the vehicle speed is not more than the threshold VL, and the steering direction is a direction toward the front passenger seat, and the steering angle is larger than the threshold SB1 (No in Step S37), it is estimated that the pedestrian who has collided with the vehicle 1 is received at the middle portion region RC or the right region RR. Therefore, the ECU 40 determines both the air bags 22R and 22L (air bag devices 20R and 20L) as the operation targets and operates the right air bag device 20R and the left air bag device 20L in this order (Steps S41 and S43). To be specific, in this case, it is estimated that the pedestrian is received by the air bags 22R and 22L while relatively moving from the left side of the vehicle 1 toward the middle portion of the vehicle 1 or toward the right side of the vehicle 1. Therefore, to prevent the air bag at the upper side from being lifted up when receiving the pedestrian, the operations of the air bag devices 20R and 20L are controlled such that: the right air bag 22R is deployed before the left air bag 22L is deployed; and the tip end portion 26 of the left air bag 22L overlaps an upper side of the tip end portion 26 of the right air bag 22R.

Operational Advantages

According to the vehicle 1, when the detection signals are input from the G sensors 30a-30d to the ECU 40, and with this, the collision of the vehicle 1 with the pedestrian is detected, the pop-up actuators 28 and the air bag devices 20R and 20L operate. With this, the air bags 22R and 22L are deployed from between the hood 4 and the cowl portion 10 toward the windshield 6. When the air bags 22R and 22L are deployed, the tip end portions 26 of the air bag base portions 24a overlap each other at the vehicle width direction middle portion of the vehicle 1, and with this, a gap is prevented from being formed between the right and left air bags 22R and 22L. Therefore, the pedestrian is effectively prevented from getting into the gap between the right and left air bags 22R and 22L.

In addition, when it is estimated that the pedestrian collision position is located at an outer side (the right side or the left side) of the middle portion of the vehicle 1 in the vehicle width direction, and a position at which the vehicle 1 is likely to receive the pedestrian is the middle portion region RC (Yes in Step S17 or No in Step S37), the ECU 40 controls the operations of the air bag devices 20R and 20L such that the air bag located closer to the pedestrian collision position overlap the upper side of the air bag located farther from the pedestrian collision position. Specifically, when the pedestrian collision position is located at the right side of the middle portion of the vehicle 1, the ECU 40 controls the operations of the air bag devices 20R and 20L such that the left air bag 22L is deployed before the right air bag 22R is deployed (Steps S17-S21). When the collision position is located at the left side of the middle portion of the vehicle 1, the ECU 40 controls the operations of the air bag devices 20R and 20L such that the deployment of the right air bag 22R is completed before the deployment of the left air bag 22L is completed (Steps S39-S43). To be specific, a time difference deployment control operation of the pedestrian air bag device 20 (the right air bag device 20R and the left air bag device 20L) is executed. Therefore, the air bag located at the upper side when receiving the pedestrian is hardly lifted up, and thus, the pedestrian can be more surely received by the air bags. On this account, there is an advantage that the pedestrian impact absorption performance improves.

Especially, in the above vehicle 1, as described above, based on the vehicle speed and the steering angle of the steering wheel, the ECU 40 estimates a position at which the pedestrian who has collided with the vehicle 1 is received. Therefore, the reliability of the estimation of the position is high, and the above-described time difference deployment control operation of the pedestrian air bag device 20 (the right air bag device 20R and the left air bag device 20L) can be satisfactorily executed. To be specific, when the vehicle speed is high, the movement direction of the pedestrian after the collision tends to depend on the vehicle speed. When the vehicle speed is low, the movement direction of the pedestrian after the collision tends to depend on the steering angle and steering direction of the steering wheel. Therefore, as in the above embodiment, according to the configuration in which the position at which the pedestrian who has collided with the vehicle 1 is received is estimated based on the vehicle speed and the steering angle of the steering wheel, the movement direction of the pedestrian after the collision can be accurately estimated, and the air bag devices 20R and 20L can be appropriately operated.

Further, according to the vehicle 1, when it is estimated that the pedestrian who has collided with the vehicle 1 is received at the left region RL of the vehicle 1 (No in Step S15 or Yes in Step S29, S35, or S37), as described above, the function of the pedestrian air bag device 20 which function is to receive the pedestrian by the air bag is achieved by deploying only the left air bag 22L, and in addition, the field of view of the driver is secured, and the vehicle can be safely stopped. On this account, according to the vehicle 1, there is an advantage that while protecting the pedestrian who has collided with the vehicle 1, the safety of the vehicle 1 can be secured i.e., secondary collision in which the vehicle 1 collides with an object can be avoided.

Further, according to the vehicle 1, each of the tip end portions 26 of the right and left air bags 22R and 22L (air bag base portions 24a) has a tapered shape that gradually decreases in thickness uniformly with respect to the center line O extending through the thickness direction center. Therefore, in both cases where the right air bag is located at the upper side and where the left air bag is located at the upper side, the tip end portions of the air bags can satisfactorily overlap each other without problems. Therefore, when executing the above time difference deployment control operation, the pedestrian impact absorption performance can be satisfactorily achieved.

According to the vehicle 1, the pop-up actuators 28 operate, and the pedestrian air bag device 20 (air bag devices 20R and 20L) operates at a timing at which the pop-up of the hood 4 is started. Therefore, with this, there is an advantage that the air bags 22R and 22L can be deployed as quickly as possible while assisting the pop-up of the hood 4 by the deployments of the air bags 22R and 22L.

Others, Modified Examples, Etc

The vehicle 1 is an example of a preferred embodiment of the vehicle 1 to which the pedestrian protecting device according to the present invention is applied. A specific configuration of the vehicle 1 may be suitably changed within the scope of the present invention. For example, the following configurations may be adopted.

(1) The vehicle 1 of the above embodiment is a right-hand drive vehicle. However, the present invention is also applicable to a left-hand drive vehicle. In this case, the air bag devices 20R and 20L are controlled based on a flow chart which corresponds to the flow chart of FIGS. 8 and 9 but in which left and right are reversed, i.e., the driver's seat side and the front passenger seat side are reversed. With this, the left-hand drive vehicle 1 can obtain the same operational advantages as the right-hand drive vehicle 1.

(2) In the above embodiment, the air bag devices 20R and 20L are arranged at the rear surface of the hood 4. However, the air bag devices 20R and 20L may be arranged at the cowl portion 10. Or, one of the air bag devices 20R and 20L may be arranged at the rear surface of the hood 4, and the other of the air bag devices 20R and 20L may be arranged at the cowl portion 10. Further, the air bag devices 20R and 20L may be arranged at the rear surface of the hood 4, and the air bags 22R and 22L may be deployed through opening portions formed at the rear end portion 4a of the hood 4.

(3) In the above embodiment, the G sensors 30a-30d are used as the collision position detector of the present invention configured to detect the pedestrian collision position of the vehicle 1 in the vehicle width direction. However, a collision position detector other than the G sensors 30a-30d may be used. For example, the pedestrian collision position may be detected by further using an on-vehicle camera 36 (see FIG. 7) as the collision position detector. It should be noted that for example, a technology disclosed in Japanese Laid-Open Patent Application Publication No. 2007-69806 can be used as a technology of detecting the pedestrian collision position by using the on-vehicle camera as above.

REFERENCE CHARACTERS LIST 1 vehicle
4 hood
6 windshield
10 cowl portion
12 cowl grill
20 pedestrian air bag device
20R right air bag device
20L left air bag device
22R right air bag
22L left air bag
24a air bag base portion
24b air bag side portion
26 tip end portion
30a-30d G sensor (collision position detector)
32 vehicle speed sensor (vehicle speed detector)
33 steering angle sensor (steering angle detector)
40 ECU (controller)

The invention claimed is:

1. A pedestrian protecting device mounted on a vehicle, the vehicle including a windshield and a hood, the hood being located in front of the windshield and covering an engine, the pedestrian protecting device comprising:
a right air bag device including a right air bag configured to be deployed at a region spreading from a rear end portion of the hood to the windshield and located mainly at a right side of the vehicle;
a left air bag device including a left air bag configured to be deployed at a region spreading from the rear end portion of the hood to the windshield and located mainly at a left side of the vehicle;
a collision position detector configured to detect a pedestrian collision position of the vehicle in a vehicle width direction;

a controller configured to control operations of the air bags, wherein:

the right and left air bags include respective tip end portions which vertically overlap each other at a middle portion of the vehicle in the vehicle width direction when the right and left air bags are deployed; and the controller executes a time difference deployment control operation of, when the pedestrian collision position detected by the collision position detector is located at a left side of the middle portion of the vehicle in the vehicle width direction, operating the air bag devices such that a deployment of the right air bag is completed before a deployment of the left air bag is completed, and when the pedestrian collision position is located at a right side of the middle portion of the vehicle, operating the air bag devices such that the deployment of the left air bag is completed before the deployment of the right air bag is completed.

2. The pedestrian protecting device according to claim 1, wherein:

when the pedestrian collision position detected by the collision position detector is located at the right or left side of the middle portion of the vehicle in the vehicle width direction, the controller estimates a vehicle width direction position at which the vehicle is likely to receive the pedestrian; and when the estimated position is located at the middle portion of the vehicle, the controller executes the time difference deployment control operation.

3. The pedestrian protecting device according to claim 2, wherein:

the vehicle includes a steering angle sensor configured to detect a steering angle and steering direction of a steering wheel of the vehicle; and the controller executes the time difference deployment control operation when i) the pedestrian collision position detected by the collision position detector is located at the right side of the middle portion of the vehicle in the vehicle width direction, ii) the steering direction is a right direction, and iii) the steering angle is a predetermined threshold or more or when i) the pedestrian collision position detected by the collision position detector is located at the left side of the middle portion of the vehicle in the vehicle width direction, ii) the steering direction is a left direction, and iii) the steering angle is the predetermined threshold or more.

4. The pedestrian protecting device according to claim 3, wherein:

each of the tip end portions of the air bags has a tapered shape that gradually decreases in vertical thickness in the vehicle width direction; and each of the tip end portions of the air bags uniformly changes in thickness with respect to a thickness direction middle portion of the tip end portion of the air bag.

5. The pedestrian protecting device according to claim 3, wherein:

the tip end portion of one of the right and left air bags has a shape that tapers from a front side toward a rear side in a vehicle front-rear direction; and the tip end portion of the other of the right and left air bags has a shape that tapers from the rear side toward the front side in the vehicle front-rear direction.

6. The pedestrian protecting device according to claim 2, wherein:

each of the tip end portions of the air bags has a tapered shape that gradually decreases in vertical thickness in the vehicle width direction; and each of the tip end portions of the air bags uniformly changes in thickness with respect to a thickness direction middle portion of the tip end portion of the air bag.

7. The pedestrian protecting device according to claim 2, wherein:

the tip end portion of one of the right and left air bags has a shape that tapers from a front side toward a rear side in a vehicle front-rear direction; and the tip end portion of the other of the right and left air bags has a shape that tapers from the rear side toward the front side in the vehicle front-rear direction.

8. The pedestrian protecting device according to claim 1, wherein:

each of the tip end portions of the air bags has a tapered shape that gradually decreases in vertical thickness in the vehicle width direction; and each of the tip end portions of the air bags uniformly changes in thickness with respect to a thickness direction middle portion of the tip end portion of the air bag.

9. The pedestrian protecting device according to claim 1, wherein:

the tip end portion of one of the right and left air bags has a shape that tapers from a front side toward a rear side in a vehicle front-rear direction; and the tip end portion of the other of the right and left air bags has a shape that tapers from the rear side toward the front side in the vehicle front-rear direction.

* * * * *